(12) United States Patent
Pournazari et al.

(10) Patent No.: US 12,428,946 B2
(45) Date of Patent: Sep. 30, 2025

(54) METHOD AND SYSTEM FOR ACTIVE LEARNING AND OPTIMIZATION OF DRILLING PERFORMANCE METRICS

(71) Applicant: Nvicta LLC., Austin, TX (US)

(72) Inventors: Parham Pournazari, Austin, TX (US); Gurtej Saini, Austin, TX (US)

(73) Assignee: Nvicta LLC., Austin, TX (US)

( * ) Notice: Subject to any disclaimer, the term of this patent is extended or adjusted under 35 U.S.C. 154(b) by 409 days.

(21) Appl. No.: 16/826,253

(22) Filed: Mar. 22, 2020

(65) Prior Publication Data

US 2020/0308952 A1 Oct. 1, 2020

Related U.S. Application Data

(60) Provisional application No. 62/824,432, filed on Mar. 27, 2019.

(51) Int. Cl.
| | |
|---|---|
| *E21B 44/02* | (2006.01) |
| *E21B 44/00* | (2006.01) |
| *G05B 13/02* | (2006.01) |
| *G05B 13/04* | (2006.01) |

(52) U.S. Cl.
CPC .............. *E21B 44/02* (2013.01); *E21B 44/00* (2013.01); *G05B 13/0265* (2013.01); *G05B 13/042* (2013.01); *G05B 13/048* (2013.01); *E21B 2200/22* (2020.05)

(58) Field of Classification Search
CPC ................................. E21B 44/00; E21B 44/02
See application file for complete search history.

(56) References Cited

U.S. PATENT DOCUMENTS

| | | | |
|---|---|---|---|
| 2008/0164062 A1* | 7/2008 | Brackin | E21B 21/103 175/24 |
| 2009/0090555 A1* | 4/2009 | Boone | E21B 44/02 175/45 |
| 2012/0217067 A1* | 8/2012 | Mebane, III | E21B 44/02 175/57 |
| 2017/0044896 A1* | 2/2017 | Salminen | E21B 49/003 |
| 2017/0306703 A1* | 10/2017 | Samuel | E21B 10/08 |
| 2018/0119534 A1* | 5/2018 | Jamison | G05B 17/00 |
| 2019/0234207 A1* | 8/2019 | Subramaniyan | G06N 3/126 |
| 2020/0011158 A1* | 1/2020 | Xu | G06N 20/00 |

\* cited by examiner

*Primary Examiner* — Kristyn A Hall
(74) *Attorney, Agent, or Firm* — Egan, Enders & Huston LLP.

(57) ABSTRACT

A system and method of real-time optimization of drilling performance metrics during a well drilling operation, for oil and gas as well as geothermal wells, or wells drilled for any other purpose. In a preferred form, the system receives information about allowable drilling metrics and real-time information of performance indicators. The drilling performance metrics and performance indicators are used to build a model to predict drilling parameters likely to optimize one or more drilling performance metrics.

21 Claims, 5 Drawing Sheets

METHOD AND SYSTEM FOR ACTIVE LEARNING AND OPTIMIZATION OF DRILLING PERFORMANCE METRICS

This application claims priority to Provisional Patent Application No. 62/824,432 filed Mar. 27, 2019, the disclosure of which is expressly incorporated herein by reference

BACKGROUND

During the wellbore construction process, it is of interest to the operator to maximize/minimize certain performance metrics that assess the efficiency of the drilling process. Some performance metrics such as rate-of-penetration (ROP) have a highly complex relationship to the controllable drilling parameters such as RPM, flowrate, mud rheology, and weight-on-bit (WOB), and therefore modeling this relationship is often difficult and inaccurate. Other performance metrics include Mechanical Specific Energy (MSE) which the operator tries to minimize.

Several academic and commercial products have attempted to automate the drilling parameter selection process by relying on physics-based models, historical data, or a combination of historical and real-time data, by observing drilling trends, and changing the drilling parameters to optimize the aforementioned performance metrics. However, because the effect of changing the drilling parameters on the performance metric is not fully deterministic, the automated software has to experiment with the drilling environment in real-time and perform learning and optimization at the same time. The methods detailed in U.S. Pat. No. 9,482,084, WO 2019222122A1, U.S. Pat. No. 8,121,971, US 20160313217, US 20160313217, US 2015022784, US 20150218914, US 20030220742, US 20170044896, and U.S. Pat. No. 9,598,947 (incorporated by reference) fail to address the problem of automated exploration of the action space and focus their attention only on observing the performance metrics and optimizing them in real-time. These methods also fail to provide a methodology to achieve multi-objective optimization through performance metric aggregation. Addressing such shortcomings is one object of the present invention.

SUMMARY OF THE INVENTION

The present invention addresses a technique for handling the exploration vs. exploitation trade-off for an automated drilling system, allowing the system to simultaneously and efficiently learn about the drilling environment and optimize a set of aggregated drilling performance metrics. One object of the present invention is to provide a method for real-time optimization of performance metrics in drilling operations and thereby a system for autonomous selection of drilling parameters. Optimality in this case refers to optimization of an aggregate drilling efficiency metric, which is derived using a novel perceptron model which takes as input several performance metrics including but not limited to MSE, ROP and drilling dysfunctions.

In a broad form, one method for real-time performance optimization in drilling operations in accordance with the present invention involves utilizing information about the allowable drilling parameters (dictated by drilling rig constants, well design, limitations on other auxiliary rig equipment etc.), in conjunction with the received real-time surface and downhole drilling parameter information (for instance ROP, torque, block-height, hook-load), evaluated drilling metrics (MSE, depth-of-cut, drilling dysfunctions etc.) and performance indicators (including drilling efficiency), to modify controllable drilling parameters such as rotary RPM, WOB, differential pressure and flowrate for optimizing the drilling performance parameters of interest. One performance optimization method in the present invention applies probabilistic optimization to the drilling performance optimization problem, where through autonomous interaction with the environment, a data-based model of the environment is learned by the system. The learned model of the environment is then used to predict the set of drilling parameters that are most likely to yield the optimal drilling efficiency.

It is therefore one object of this invention to provide a system, method and a computing architecture for autonomous parameter selection and performance optimization in drilling.

One object of this invention is to provide a method for aggregating several different performance metrics into one holistic metric called drilling efficiency. The proposed model, called the Reward Model herein, uses a perceptron architecture to merge real-time performance indicators with baseline data and aggregate them through various activation functions. The response of this model can be tuned manually by an expert designer or automatically through inverse learning from an expert driller.

It is another object of this invention to provide a method for modeling the said drilling efficiency metric as a function of controllable parameters using a probabilistic model. The drilling performance metric, as a function of the controllable parameters, is modeled using a probabilistic model such as a Gaussian Process (GP), where the GP can be initialized with any a priori knowledge about the drilling environment, such as offset well data and expert knowledge. The GP model is augmented and trained in real-time, with aggregated performance indicator data, obtained from sensors on the drilling rig. The GP can then be used to predict the response of the environment to controllable drilling parameters in the form of a probability distribution conditioned on the observed training data.

It is a further object of this invention to provide a method for efficiently using the probabilistic model to select high value control action sets for the system, as well as a method to accelerate the learning rate of the system. Prior to real-time operation, the system's knowledge is limited to its a priori knowledge, i.e. the initial training from historical data from offset wells, physics-based simulations, and expert knowledge. In real-time, the goal of the system is to refine this knowledge by strategically experimenting with the environment through autonomous selection of the drilling parameters. Since the system primarily learns most in regions of the action space where it has previously chosen to act within, the optimization process can be accelerated if the system chooses to sometimes act in regions where the uncertainty is high. This allows the system to continuously learn about the entirety of the action-space and not get stuck in local minima while optimizing. The system models the action selection task using an acquisition function which is a function of the probability distribution obtained from the GP. The system then aims to optimize this acquisition function rather than the original objective function using any standard gradient-free, heuristic-based optimization technique.

DETAILED DESCRIPTION OF THE INVENTION

Embodiments of the present invention will be described using the drawings presented herein. The drawings illustrate the various embodiments of a system, method and computing architecture for optimal well path planning that can be used in directional drilling, and other related embodiments. Like reference numbers are designated to various elements that are part of the same system, method and/or computing architecture. The figures are not necessarily drawn to scale, and in some instances have been exaggerated and/or simplified for illustrative purposes only.

The discussion herein referring to drilling parameters, drilling performance measurements, etc., refers to parameters, measurements, and performance during any of the variety of operations that cut rock away from the formation. As is well known in the drilling industry, a number of factors affect the efficiency of drilling operations, including factors within the operators' control and factors that are beyond the operators' control. For the purposes of this application, the term drilling conditions will be used to refer generally to the conditions in the wellbore during the drilling operation. The drilling conditions are comprised of a variety of drilling parameters, some of which relate to the environment of the wellbore and/or formation and others that relate to the drilling activity itself.

For example, drilling parameters may include rotary speed (RPM), WOB, characteristics of the drill bit and drillstring, mud weight, mud flow rate, lithology of the formation, pore pressure of the formation, torque, pressure, temperature, ROP, MSE, vibration measurements, etc. As can be understood from the list above, some of the drilling parameters are controllable and others are not. Similarly, some may be directly measured and others must be calculated based on one or more other measured parameters.

In the present application, "drilling performance indicators" refers to parameters, measurement and performance, whether directly measured or calculated based on measured parameters. "Controllable drilling parameters" refers to those parameters that are controllable and includes rotary speed (RPM), weight on bit (WOB), differential pressure and flowrate, mud flow rate, mud pressure, mud rheology, mud additives, drill bit design and configuration to name a few.

Figure 1:
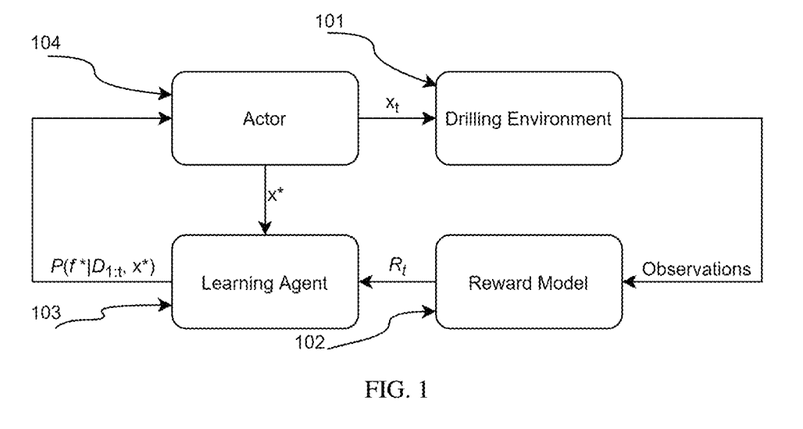
FIG. 1 illustrates a block diagram of a preferred embodiment of a method in that may be used for autonomous drilling parameter selection and real-time optimization in drilling operations.

Referring to the drawing of FIG. 1, an overall architecture of the autonomous drilling system, including the three main components, the Reward Model 102, the Learning Agent 103, and the Actor 104, is presented. The role of the Actor is to systematically search an allowable solution space and determine the controllable drilling parameters to be assigned to the Drilling Environment, 101. The Drilling Environment 101 consists of the drilling equipment, including the top drive, drawworks, the mud pumps, the rig control system, the drillstring, the drill-bit and the associated dynamics due to the interaction of the drill-bit with the rock formation, and the suite of the drilling sensors and data acquisition systems that measure various drilling performance indicators such as ROP, torque, flow-rate and tool-face stability. The Reward Model 102 is an aggregator of various performance metrics into a single reward output. The role of the Learning Agent 103 is to keep track of the reward output $R_t$, and perform nonlinear regression learning of the action value function $Q(a)$, where a is the action set vector represented most commonly by a set of controllable drilling parameters such as [RPM, WOB]. With the Learning Agent 103 capable of predicting the action value as a function of an action, the Actor 104 can use the Learning Agent 103 to search the solution space and provide a suitable action to the drilling control system in feasible time. While this process is continuously repeated, the Actor 104 waits for the dynamics of the newly assigned action to stabilize, before using the Learning Agent 103 to suggest a new action to the drilling control system.

Figure 2:
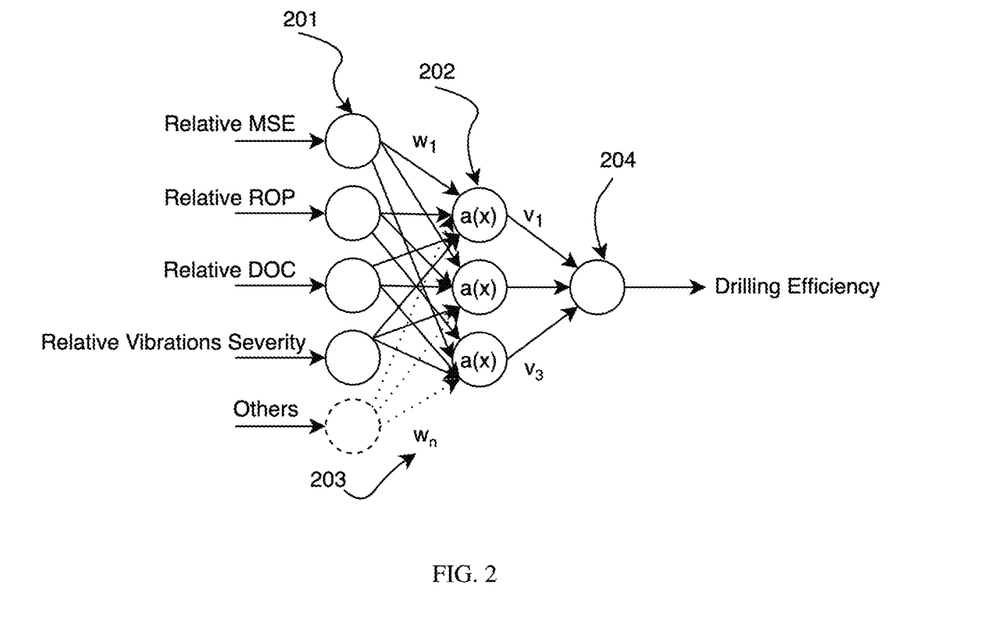
FIG. 2 illustrates a diagram of a preferred embodiment of a method in accordance with the present invention that may be used to aggregate several different performance indicators into one drilling efficiency metric.

FIG. 2. demonstrates the Reward Model 102 which employs a perceptron model, and its input layer 201 aggregates several different performance indicators such as ROP, MSE, DOC, steering quality represented by the severity of variations in the tool-face angle, and vibrations severity due to stick-slip and/or lateral and axial vibrations, as well as their baseline values in different rock formations obtained from past data. The perceptron model can use a combination of various activation functions 202 such as the hyperbolic tangent, sigmoid, or the radial basis function, to aggregate all metrics into a single metric called drilling efficiency 204. The weights of the perceptron model 203 can be tuned in several different ways including: manually by an expert designer; automatically using training with a well-performing dataset; or automatically through inverse learning from an expert driller.

Figure 3:
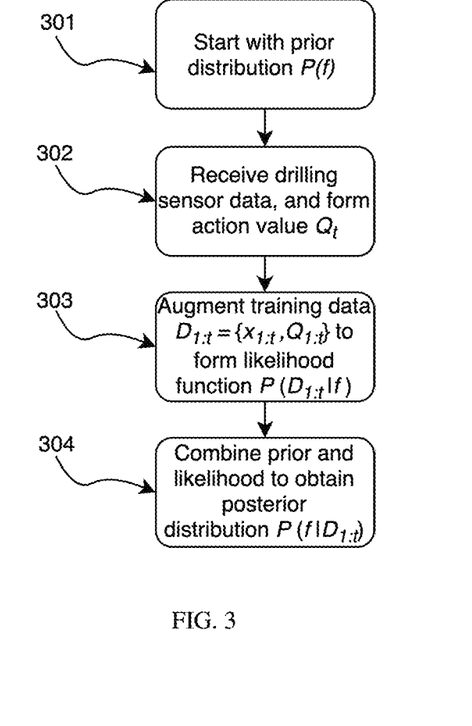
FIG. 3 illustrates a flow chart of a method in accordance with the present invention that may be used to generate a probabilistic model of drilling efficiency as a function of controllable drilling parameters.

FIG. 3. provides a flowchart that illustrates the nonlinear regression procedure used by the Learning Agent 103 of FIG. 1. The Learning Agent 103 starts with a Gaussian process (GP) prior function 301, which can represent the a priori knowledge the Learning Agent 103 has about the relationship between the efficiency metric and the actions. When an action is taken, the Learning Agent 103 improves its knowledge of the environment by augmenting its training data with an updated action value 302. At time step, t, the action is taken, and a reward $R_t$ is received. In its simplest form, the action value function can be defined as the instantaneous reward from the Reward Model. The problem with simply letting $Q_t=R_t$ is that the Learning Agent 103 forgets its past every time it repeats an action, and if $R_t$ comes from a probability distribution, the Learning Agent 103 cannot learn the true value of that particular action by sampling it only once. In a non-stationary drilling environment where the rewards are both noisy and time-varying, it is desirable to define the action value as a function of its past value and the incremental gain in reward at time, t, such that $$Q_t = Q_{t-1} + \alpha[R_t - Q_{t-1}]$$

where $\alpha$ is the fixed learning rate.

The new action value is used to augment the training data $D_{1:t}$, 303, to train a GP model. A GP is a probabilistic learning method based on an infinite-dimensional Gaussian distribution. A GP is a distribution over functions, fully specified by its mean function, m, and covariance function, k, such that:

$$f(x) \sim GP(m(x), k(x,x'))$$

See e.g., Brochu, Eric, Vlad M. Cora, and Nando De Freitas. "A tutorial on Bayesian optimization of expensive cost functions, with application to active user modeling and hierarchical reinforcement learning." arXiv preprint arXiv: 1012.2599(2010). (Incorporated by reference)

The covariance function, which represents the proximity of the observations in the state-space, can take many forms, one of which can be the squared exponential function:

$$k(x_i, x_j) = \exp(-\tfrac{1}{2}\|x_i - x_j\|^2)$$

Using the function above to obtain the individual covariance values, the multivariate normal distribution $N(0, K)$ is given by:

$$K = [k(x_1, x_1) \ldots k(x_1, x_t) \vdots \ddots \vdots k(x_t, x_1) \ldots k(x_t, x_t)]$$

To predict the value f* at the desired action x*, one can note that $f_{1:t}$ and f* are jointly Gaussian such that:

$$\begin{pmatrix} f_{1:t} \\ f^* \end{pmatrix} \sim N(0, [K \ k \ k^T \ k(x^*, x^*)])$$

where $$k = [k(x^*, x_1), k(x^*, x_2) \ldots k(x^*, x_t)]$$

Using the Sherman-Morrison-Woodbury formula, the predictive distribution 204, is obtained as:

$$P(D_{1:t}, x) = N(\mu_t(x^*), \sigma_t^2(x^*))$$

where $$\mu_t(x^*) = k^T K^{-1} f_{1:t}$$

$$\sigma_t^2(x^*) = k(x^*, x^*) - k^T K^{-1} k$$

Figure 4:
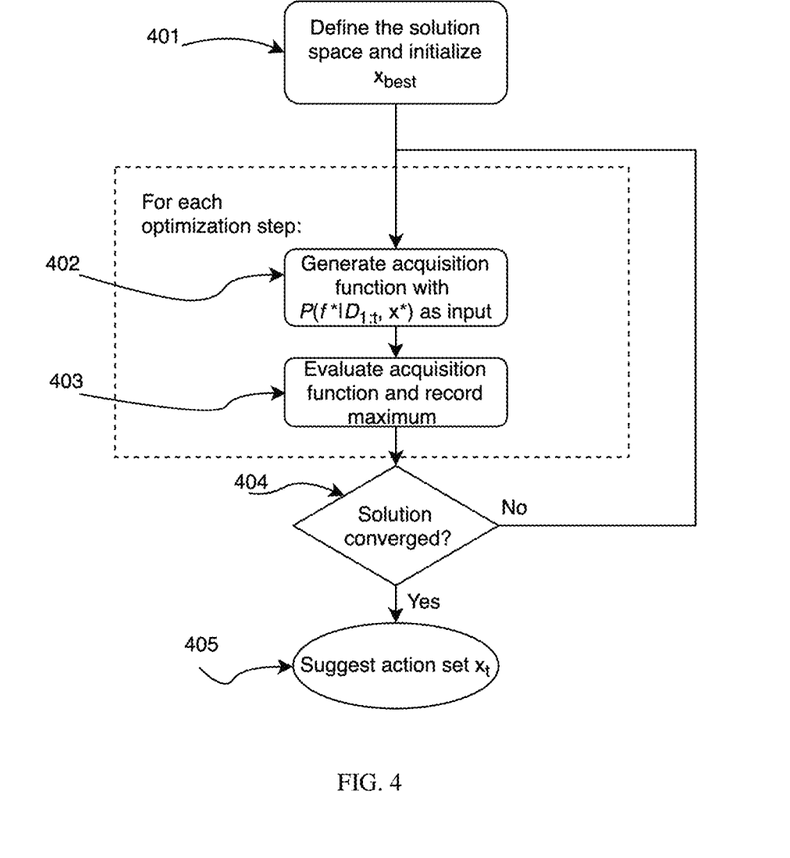
FIG. 4 illustrates a flow chart of a preferred embodiment of a method in accordance with the present invention that may be used with the method of FIG. 3 to determine an action set that is both high in uncertainty and value, to suggest to the drilling control system.

Referring now to the drawing of FIG. 4, a flowchart of a method for autonomous action selection used by the Actor 104 of FIG. 1. is shown, which also interacts with the probabilistic model of the Learning Agent 103 in FIG. 3. The goal of the Actor 104 is to use the Learning Agent 103 and optimize an acquisition function which is a function of both the predicted value of an action, as well its predicted variance, or the uncertainty in the prediction. To search and optimize the acquisition function, any standard optimization algorithm can be used, but derivative-free global methods are preferred. One such algorithm is Particle Swarm Optimization, and another is DIRECT, a deterministic, derivate-free optimizer. DIRECT is especially useful in the context of active learning due to its interrupt-ability, meaning that at any point in the optimization process it can output its best result obtained so far. The Actor 104 searches a solution space as specified by the user 401, and attempts to find a solution Xbest of any size that maximizes the acquisition function 402. Once no marginal improvement is observed by further searching and the solution has converged 404, the solution that maximizes the acquisition function is suggested 405.

Figure 5:
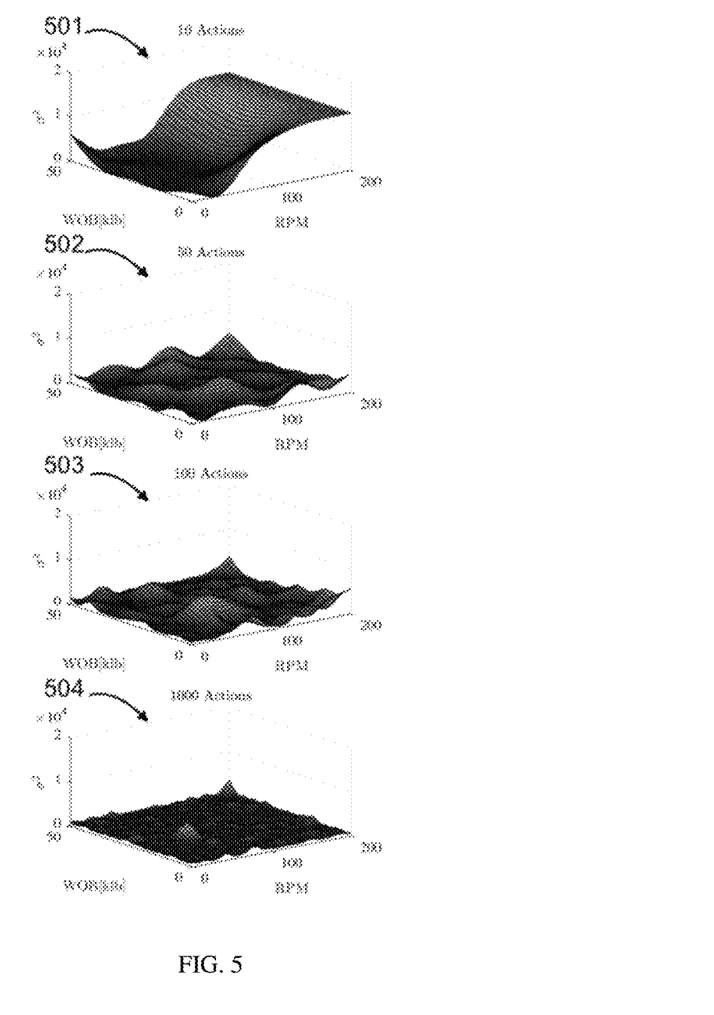
FIG. 5 illustrates a two-dimensional uncertainty surface of controllable drilling parameters, produced by the modeling method of FIG. 3, which is reduced over time as a result of system experimentation with the drilling environment.

For the acquisition function 402, the goal is to optimize based on $P(D_{1:t}, x^*)$ rather than $\mu_t(x^*)$. In other words, rather than solely optimizing the original unknown objective function, the Actor 104 aims to also promote exploration of the action space by incorporating the probability distribution given by $P(D_{1:t}, x^*)$. This will, in the long term, result in learning of the entire action-space which will increase the chances of the Actor 104 finding the global optimal action for multi-objective optimization task. The fastest way to learn about the state-space is to sample it randomly but random sampling can be costly since each action can result in negative rewards caused by drilling dysfunctions. In FIG. 5. for instance, after the Actor has taken 10 random actions 501, the uncertainty in most of the state-space is quite high. While 50 actions 502, and then 100 actions 503 continue to improve the system's learning of the action-space, learning has not converged until 1000 actions have been taken 504. Therefore, strategic handling of exploration of the action-space is important in making the optimization task time-optimal. It is possible for the system to choose to explore higher promising regions of the action space, where an improvement is likely. An improvement-based acquisition function can be constructed by evaluating the probability of improvement (PI), such that:

$$PI(x) = P(f(x) \geq f(x^+) + \epsilon)$$

where $x^+$ is the best performing control set observed so far, x is action being evaluated, and $\epsilon$ is a trade-off parameter. See, Brochu, Eric, Vlad M. Cora, and Nando De Freitas. "A tutorial on Bayesian optimization of expensive cost functions, with application to active user modeling and hierarchical reinforcement learning." arXiv preprint arXiv: 1012.2599(2010).

PI explicitly looks at the probability that the next action to be chosen will perform better than the best observed result so far. A different way of approaching the acquisition function is to not only account for the probability of improvement, but also the magnitude of improvement. one can use the expected improvement function as the acquisition function, such that:[11]

$$EI(x) = \begin{cases} (\mu(x) - f(x^+) - \epsilon)\Phi(Z) + \sigma(x)\phi(Z), & \text{if } \sigma(x) > 0 \\ 0, & \text{if } \sigma(x) = 0 \end{cases}$$

$$Z = \frac{\mu(x) - f(x^+) - \epsilon}{\sigma(x)}$$

where $\phi$ and $\Phi$ denote the PDF and CDF of the standard normal distribution. A third method for constructing an acquisition function is through a regret minimization framework where instantaneous regret is defined as:

$$r(x) = f(\underline{x}) - f(x)$$

where $\underline{x}$ is the optimal action of the true objective function, and cumulative regret as:

$$R_T = r(x_1) + \ldots r(x_T).$$

It can be then shown, that GP-UCB method criteria will minimize this cumulative regret such that:

$$GP\text{-}UCB(x) = \mu(x) + \sqrt{\nu \tau_t \sigma(x)}$$

where $$\tau_t = 2 \log \log\left(\frac{t^{\frac{d}{2}+2}\pi^2}{3\delta}\right)$$

and $\nu > 1$, and t is the number of timesteps since the optimization task began. GP-UCB does not rely on a constant trade-off between exploration and exploitation, as shown in the expression for $\tau_t$ which is a logarithmic function of time.

The invention claimed is:

1. A computer-implemented method for optimization of a single drilling efficiency metric during a well drilling operation, comprising:
   (1) sensing information from one or more sensors during the well drilling operation about drilling performance indicators, including one or more of rate-of-penetration (ROP), Torque, Flow-rate, or tool face stability depth-of-cut (DOC), or mechanical specific energy (MSE);
   (2) collecting information about two or more of controllable drilling parameters, including one or more of rotary speed (RPM), weight-on-bit (WOB), differential pressure, flow rate, during said well drilling operation;
   (3) creating a probabilistic model of drilling efficiency to create a single drilling efficiency metric, said model generated at least in part by aggregating from two or more of said drilling performance indicators with said controllable drilling parameters using a Gaussian Process regression updated in real time;
   (4) operating an actor, implemented as a processor-controlled actuator, to create an action using a derivative-free global optimization approach to adjust one or more of the controllable drilling parameters, wherein the action is determined by processing the updated probabilistic model to optimize a probability of improvement in the single drilling efficiency metric, and wherein adjusting includes modifying one or more controllable drilling parameters;
   (5) recommending the action for well drilling operation;
   (6) operating the well drilling operation where the action created by the actor adjusts said one or more of said controllable drilling parameters during well drilling operation by increasing or decreasing one or more of rotary speed (RPM) or weight-on-bit (WOB) in order to optimize a probability of improvement in the single drilling efficiency metric; and
   (7) repeating steps (2)-(6) at least once during well drilling operation to iteratively refine the single drilling efficiency metric.

2. The method of claim 1, operating said probabilistic model by applying probabilistic optimization to data collected in step (2) during the drilling operation to derive a learned model.

3. The method of claim 2, using the learned model to predict one or more of said set of controllable drilling parameters most likely to yield the optimized drilling parameters.

4. The method of claim 1, wherein two or more of said drilling performance indicators are aggregated into one single drilling efficiency metric.

5. The method of claim 1, wherein drilling efficiency is modeled with a Gaussian Process initialized with a prior knowledge of the drilling operation.

6. The method of claim 5, training the Gaussian Process model with drilling efficiency data during drilling operation.

7. The method of claim 1, operating the updated probabilistic model (3) over a period of time prior to creating the action (4).

8. The method of claim 1, repeating step (4) until no improvement is observed prior to recommending the action.

9. The method of claim 8, the probability of improvement accounting for magnitude of improvement.

10. A computer-implemented system for autonomous selection of controllable drilling parameters during a drilling operation, comprising:
    an actor, implemented as a processor-controlled actuator, coupled to the drilling environment, including a rig control system, drill system, and one or more sensors configured to measure a plurality of controllable drilling parameters including one or more of rotary speed (RPM), weight-on-bit (WOB), differential pressure, or flow rate during said well drilling operation;
    a reward model coupled to the actor to receive one or more of a plurality of drilling performance indicators including one or more of rate of penetration (ROP), torque, flow rate or tool face stability depth-of-cut (DOC), or mechanical specific energy (MSE) and to aggregate several different performance parameters into a single drilling efficiency metric using a perceptron model;
    a learning agent coupled to said reward model and using a probabilistic model generated at least in part by aggregating drilling performance indicators with one or more of the plurality of controllable drilling parameters via Gaussian Process regression, predicting the outcome of an action to adjust one or more operations of said drilling environment;
    the actor coupled to the learning agent to implement an action to adjust one or more of said controllable drilling parameters based at least in part on the predicted outcome, by increasing or decreasing one or more of rotary speed (RPM) or weight-on-bit (WOB) to optimize a probability of improvement in the single drilling efficiency metric,
    the action using a derivative-free global optimization approach to optimize a probability of improvement in the single drilling efficiency metric, wherein adjusting includes increasing or decreasing one or more controllable drilling parameters based on one or more drilling performance indicators,
    whereby the actor, reward model, and learning agent operate over a period of time during drilling operation to implement multiple adjustments in one or more of said controllable drilling parameters.

11. The system of claim 10, the learning agent observes one or more of said drilling performance indicators of the drilling operation and performs a nonlinear regression of the action value function of one or more controllable changes in drilling operation using Gaussian Process Regression.

12. The system of claim 10, the actor which uses an acquisition function, configured to use the learning agent's predictive distribution, to search a solution space and determine one or more of said controllable drilling parameters during said drilling operation with the aim of optimizing performance and/or model learning during said drilling operation.

13. The system of claim 12, where the acquisition function uses the probability distribution obtained from the Gaussian Process of the learning agent.

14. The system of claim 12, where the reward model aggregates using a perceptron model.

15. The system of claim 14, where the perceptron model may include a combination of one or more sigmoid, hyperbolic tangent, and radial basis functions.

16. The system of claim 10, the reward model merging one or more of said plurality of controllable drilling parameters into a single drilling efficiency metric using a combination of activation functions.

17. The system of claim 10, the actor maximizing the probability of improvement in the drilling efficiency metric.

18. During a well drilling operation, a method for optimizing drilling operation comprising:
    sensing a number of drilling performance indicators from one or more sensors during a well drilling operation said drilling performance indicators including one or more of rate of penetration (ROP), Torque, depth-of-cut (DOC), or Mechanical Specific Energy (MSE), flow rate or tool face stability;

combining a plurality of drilling performance indicators into a single drilling efficiency metric using a perceptron model;

collecting information about a number of controllable drilling parameters including one or more of rotary speed (RPM), weight-on-bit (WOB), differential pressure, or flow rate during said well drilling operation;

changing one or more of said controllable drilling parameters during well drilling operation, changes the single drilling efficiency metric;

applying a probabilistic model, updated with Gaussian Process regression, to optimize a probability of improvement of said single drilling efficiency metric by determining adjustments predicted to enhance drilling performance; and operating the well drilling operation by implementing the adjustment to one or more controllable drilling parameters by increasing or decreasing one or more of rotary speed (RPM) or weight-on-bit (WOB) to optimize said probability of improvement of said single drilling efficiency metric.

19. The method of claim 18, including repeating said changing and applying step multiple times during well drilling operation.

20. The method of claim 18, the probabilistic model is updated with changes in controllable drilling parameters to optimize the probability of improvement.

21. The method of claim 18, including operating an actor to create an action using a derivative-free global optimization approach when changing one or more of said controllable drilling parameters where the action uses an updated probabilistic model to optimize the probability of improvement in well drilling operation of the single drilling efficiency metric.

* * * * *